United States Patent
Kirby et al.

[15] 3,685,900
[45] Aug. 22, 1972

[54] EXPOSURE CALCULATOR AND FILTER DEVICE FOR DARKROOM COLOR PHOTOGRAPHY

[72] Inventors: Herbert D. Kirby, Ann Arbor; George L. Nearhoof, Dexter; Jimmie Glenn Culler, Ann Arbor, all of Mich.

[73] Assignee: KMS Industries, Inc., Ann Arbor, Mich.

[22] Filed: Feb. 12, 1970

[21] Appl. No.: 10,789

[52] U.S. Cl. ..........................355/32, 96/2, 355/35, 355/71, 355/88, 356/186, 356/189, 356/192
[51] Int. Cl. ..............................................G03b 27/76
[58] Field of Search ............355/32, 35, 71, 88; 96/2; 356/175, 186, 189, 192

[56] References Cited

UNITED STATES PATENTS

| | | | |
|---|---|---|---|
| 3,529,519 | 9/1970 | Mitchell | 355/32 X |
| 3,443,868 | 5/1969 | Mitchell | 355/32 |
| 3,165,970 | 1/1965 | Pelletier | 355/71 X |

Primary Examiner—Samuel S. Matthews
Assistant Examiner—Richard A. Wintercorn
Attorney—Barnes, Kisselle, Raisch & Choate

[57] ABSTRACT

Calculator for determining proper exposure times in making color prints from color negative films comprises an opaque mask with three series of windows having respectively blue, green and red filters of graduated density. The windows have double wedge shape to provide contiguous points and other points remote therefrom. Color print paper is test exposed to light passing through the negative, a diffusion filter, and the graduated filters; when the paper is developed, the correct exposure time is indicated on the paper by the faintest double wedge image which has sharply defined points.

A filter device for use in conjunction with the calculator comprises a wheel rotatably mounted on the lens barrel of a projector and having a series of openings: one clear for focusing, one with a diffusion filter for the test exposure, and the others with blue, green, and red filters respectively.

26 Claims, 14 Drawing Figures

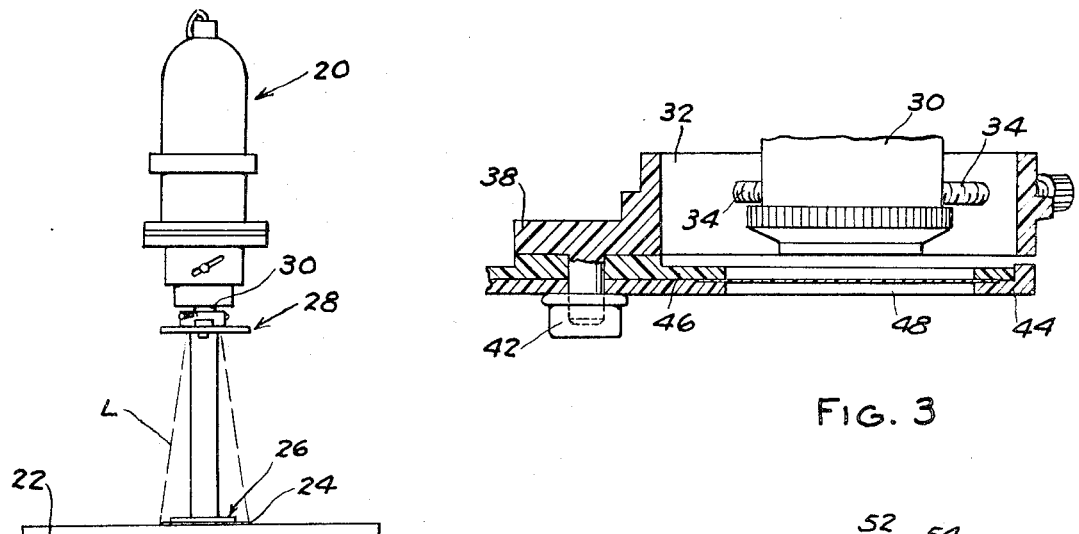
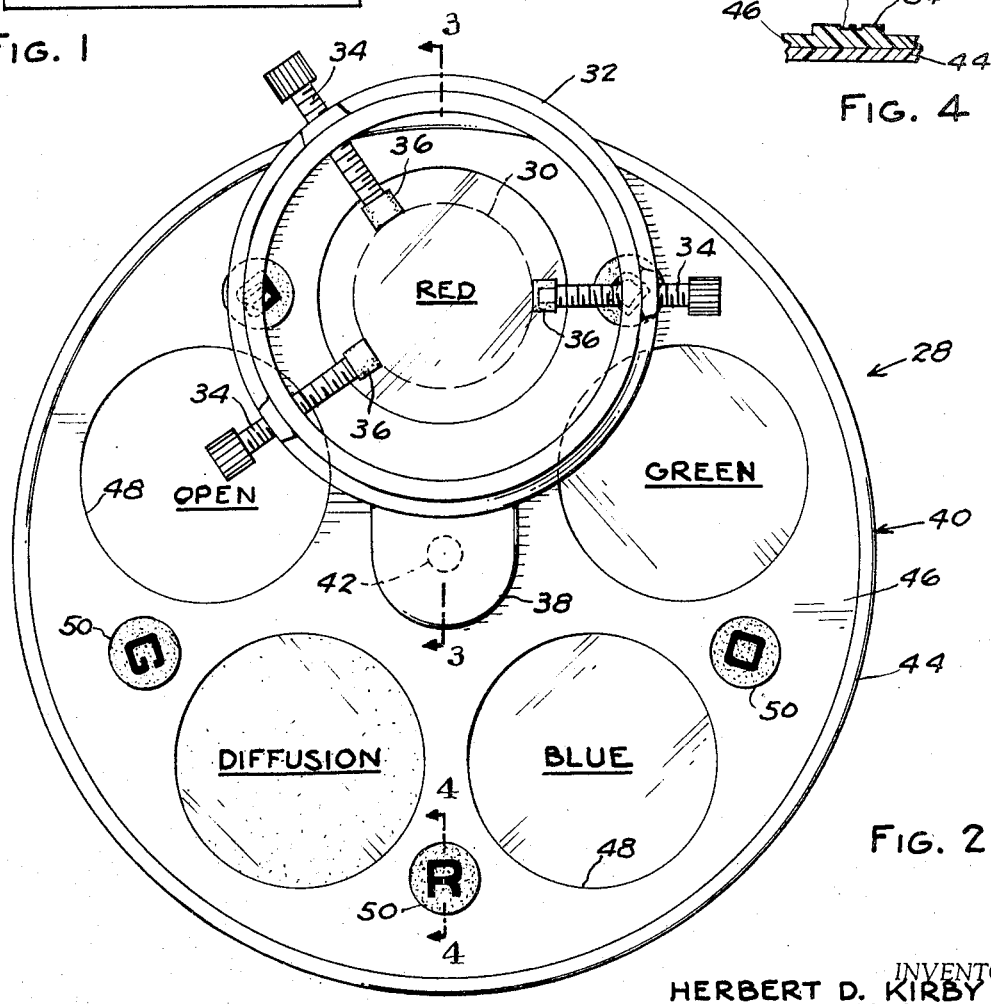

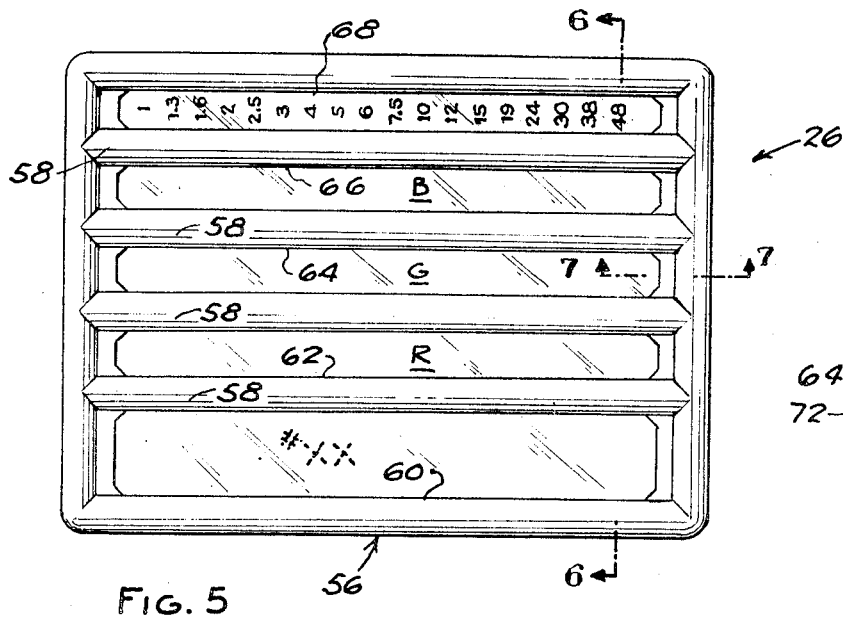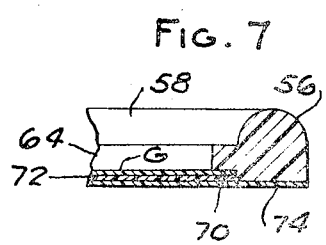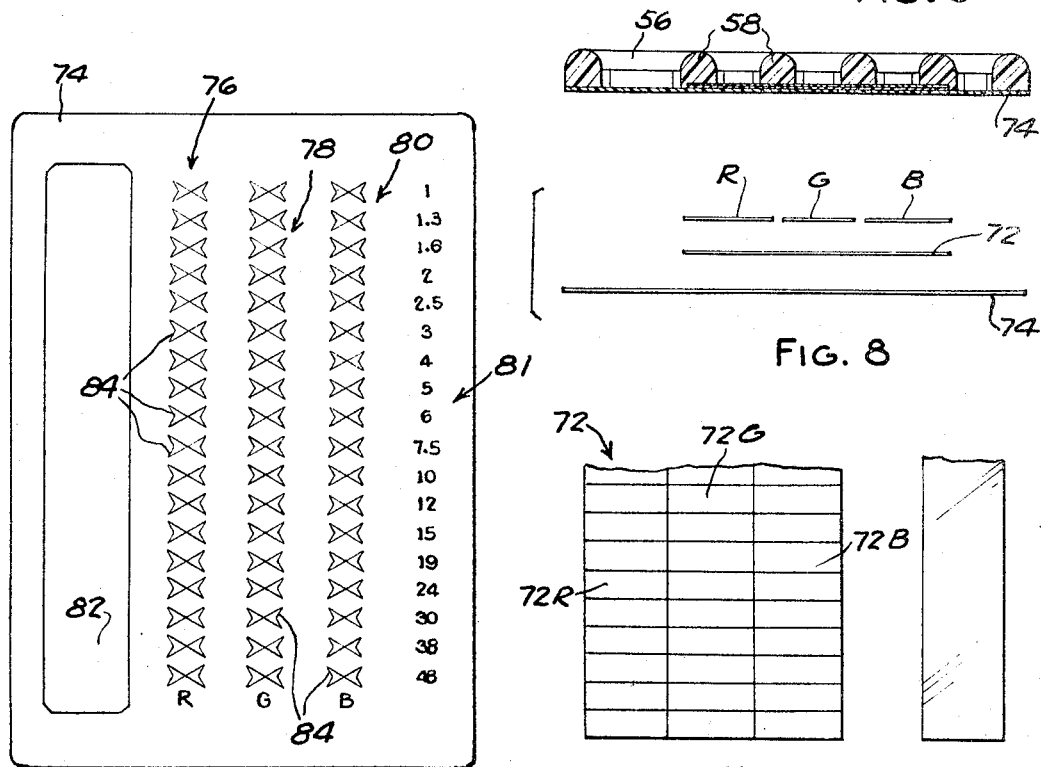

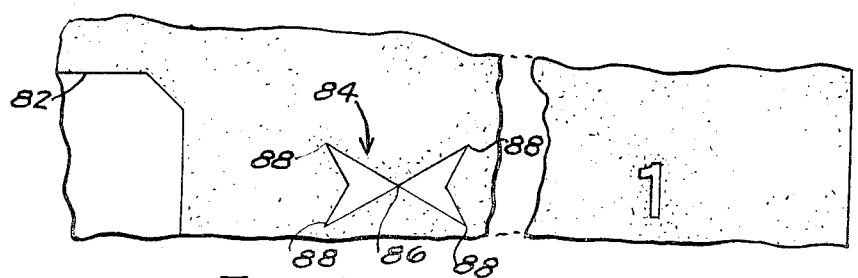
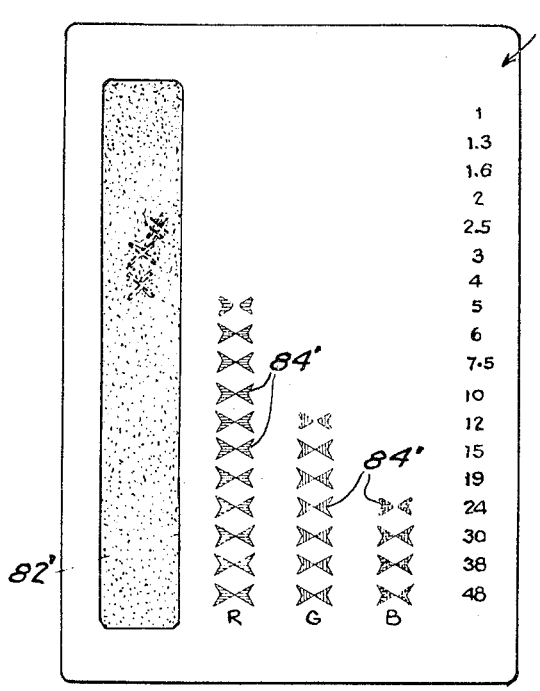
Fig. 12
Fig. 13
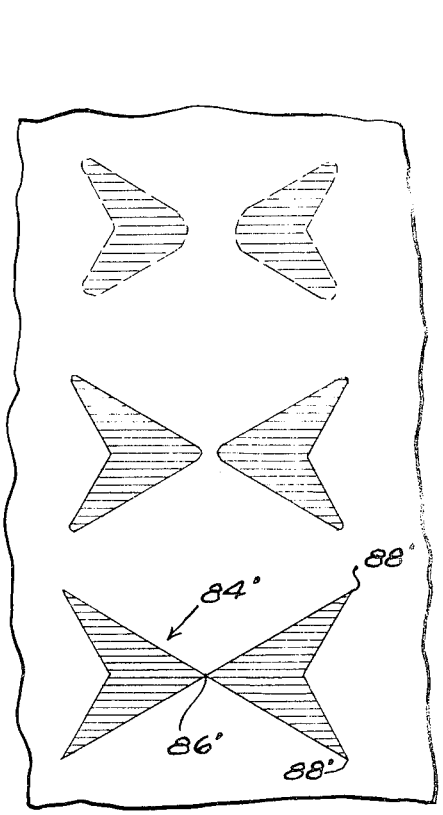
Fig. 14
INVENTORS
HERBERT D. KIRBY
GEORGE L. NEARHOOF
J. GLENN CULLER
BY Barnes, Kisselle, Raisch & Choate
ATTORNEYS

EXPOSURE CALCULATOR AND FILTER DEVICE FOR DARKROOM COLOR PHOTOGRAPHY

This invention relates to the art of making color photographic prints from color negatives. More particularly, the invention relates to a calculator for determining the exposure times for blue, green, and red light in color printing. The invention also involves a filter device for use on a projector by which various filters are mounted for movement successively into registry with the projector lens to facilitate additive color printing exposures.

It is very difficult, even for those experienced in the art, to accurately evaluate the color characteristics in an exposed and developed color negative film. There are numerous reasons for this. First, color negative films are subject to variations in manufacture which vary their response to light. Second, there are numerous variables in the developing of color negative films such as time, temperature, agitation, and cleanliness which frequently and unpredictably effect changes in the color characteristics of the color negative imagery from that specified by the manufacturer, even when the procedures recommended by the manufacturer are followed in the developing process.

Third, it is very difficult to visually evaluate color negative imagery due to the fact that the recorded colors in the negatives are complementary to the color of the subject; i.e., a red subject records as cyan, green records as magenta, and blue records as yellow. In addition, most color negative films contain an overall yellow-orange dye mask which has been added by the manufacturer to produce acceptable color prints.

Fourth, color negative films are capable of producing acceptable color prints when overexposed up to about 1½ stops, but acceptable color prints are difficult to produce when the color negative film has been underexposed. Fifth, the color print papers are, in general, subject to unpredictable variations in manufacture and development similar to the negative films.

There are expensive, complex electronic systems available for evaluating color negative films and which facilitate applying the corrections necessary in the color printing process for obtaining acceptable prints. However, such equipment is beyond the reach of all but relatively large commercial or industrial processing establishments. Without such equipment, the procedure for obtaining acceptable color prints is a sometimes lengthy, tedious trial-and-error series of exposures utilizing different exposure times in connection with different color filters followed by development of the color print paper to determine the results of the test exposures.

The primary object of this invention is to provide a very simple, inexpensive calculator by which a single test exposure will accurately determine the correct exposure time for each of the blue, green, and red filters in color printing. A related object of the invention is to provide a simple, inexpensive mount by which various filters used in color printing are movable successively into registry with the lens of the projector.

Generally, the invention contemplates the use of an opaque member having three series of translucent windows therein. Each window has a shape which defines a pair of contiguous points and other points remote therefrom. The series are provided respectively with blue, green, and red filters; and these filters are graduated in density along each series. A test exposure of color print paper is made through these filters; and in the developed paper, the faintest image in each series having sharply defined points indicates the correct exposure time for each of the blue, green, and red filters. The mount for the color filters comprises an apertured wheel mountable on the lens barrel of a projector so that a diffusion filter and the color filters can be rotated successively into registry with the projector lens.

One form of the invention is shown in the accompanying drawings.

FIG. 1 is a partly diagrammatic view illustrating the apparatus of the present invention in use.

FIG. 2 is a top plan view of a filter wheel according to the present invention.

FIG. 3 is a sectional view on line 3—3 of FIG. 2.

FIG. 4 is a sectional view on line 4—4 of FIG. 2.

FIG. 5 is a top plan view of a calculator according to the present invention.

FIG. 6 is a sectional view on line 6—6 of FIG. 5.

FIG. 7 is an enlarged sectional view on line 7—7 of FIG. 5.

FIG. 8 is an exploded end view illustrating filter strips, a gray scale, and a mask forming elements of the calculator.

FIG. 9 is a plan view of the mask.

FIG. 10 is a fragmentary plan view of the gray scale.

FIG. 11 is a fragmentary plan view of a filter strip.

FIG. 12 is an enlarged fragmentary plan view of the mask.

FIG. 13 is a plan view of an exposed and developed test color print.

FIG. 14 is an enlarged partly diagrammatic plan view of a fragment of the test color print, showing progressive reduction of color saturation in the points of the color images.

Shown in FIG. 1 is a conventional projector 20 positioned above a conventional easel 22 for supporting a sheet of color paper 24 for exposure to light L which has passed through a color negative (not shown) in the projector. A calculator 26 according to this invention is positioned over paper 24 so that the light passes through the filters and windows therein. A filter wheel 28 according to this invention is mounted on the lens barrel 30 of the projector.

Filter wheel 28 has a ring 32 dimensioned to surround the lens barrel 30 of any conventional projector, and ring 32 is provided with a plurality (preferably three) of threaded openings through which mounting screws 34 extend. The screws may be made of a plastic, such as Nylon, or a metal; and in the latter case, they are provided with plastic caps 36 for engagement with the lens barrel.

Ring 32 has a lateral tab 38 to which a wheel 40 is pivotally secured as at 42. Wheel 40 includes a base element 44 and a cover element 46, and these elements are apertured to provide a series of openings 48 whose centers are arranged circumferentially around pivot 42. A series of four filters is clamped between wheel elements 44 and 46 across four openings 48, and these filters comprise a diffusion filter and blue, green, and red filters (FIG. 2). The fifth opening is designated "Open," since there is no filter therein.

To mount filter wheel 28 on projector 20, ring 32 is placed around lens barrel 30 and adjusting screws 34 are turned to advance them inwardly into clamping engagement with the lens barrel. The center of ring 32 is at the same radial distance from pivot 42 as the centers of openings 48 so that when wheel 40 is rotated, the various openings and their filters are brought successively into alignment with the optical center of the lens in projector 20.

Cover element 46 carries five position indicators 50, each one of which is positioned diametrically opposite from an opening 48. These indicators bear indicia (letters, for example) which show the operator standing at the front of the apparatus which filter or opening is in alignment with the projector lens. As illustrated, the letters comprise O, D, B, G, and R to indicate respectively "Open," "Difussion," "Blue," "Green," and "Red." Preferably, each of these letters comprises a black portion 52 (FIG. 4) surrounded by a coating 54 of a phosphorescent material which glows in the dark to facilitate proper manipulation of the color wheel when all the lights in a darkroom are off.

Ring 32 and base and cover elements 44, 46 can be made of any suitable, inexpensive, light-weight material such as molded plastics. The diffusion filter must have a transmittance which is substantially the same for all three of the additive colors (namely, blue, green, and red). One suitable material is an inherently clear or transparent plastic such as a vinyl plastic which has been passed through shot-blasted calendar rolls to give it uniform thickness and to provide both surfaces with a roughening or texturing for light-diffusion purposes. Etched or shot-blasted glass can also be used. The color filters can comprise standard Eastman-Watten filters.

The structure of calculator 26 is illustrated in FIGS. 5–12. In the form of the invention illustrated, the calculator has a rectangular frame 56 and a number of spaced-apart ribs 58 which cooperate to define a plurality of slot-like openings 60, 62, 64, 66, and 68. The bottoms of the ribs and adjoining frame portions are recessed upwardly as at 70 (FIG. 7). A blue, translucent filter strip B is secured, as by adhesive, within recessing 70 so that it covers opening 66. Green and red translucent filter strips G and R are secured in a similar manner beneath openings 64 and 62 respectively. In order to minimize human error in transferring exposure data from the calculator to filter wheel 28, the two sets of filters therein are shown as having a similar sequence, namely blue, green, and red. Filters B, G, and R may comprise suitably selected Eastman-Wratten filters.

Mounted beneath each of the filters is a gray scale having a step-by-step graduated density along its length. These gray scales may be combined in a single element 72 (FIG. 10) wherein the individual scales for filters B, G, and R are indicated by three vertical series of rectangles 72B, 72G, and 72R. In each series, the rectangles at the top have the greatest density; and each rectangle has a density greater than that of the rectangle beneath it. In general, the overall density of scale 72R will be greater than that of scale 72B, which, in turn, will be greater than that of scale 72G, since color print emulsions are most sensitive to red light, less sensitive to blue light, and least sensitive to green light. Further detail as to the relative densities is given below.

Gray scale element 72 may comprise a black and white negative film exposed and developed in such a way as to provide the three series of density graduations, and it is secured beneath color filters B, G, and R by suitable means such as an adhesive.

An opaque mask 74 is secured to the bottom of frame 56, again by suitable means such as an adhesive, so that it underlies the filter elements and gray scale element 72. Mask 74 has three series of translucent windows 76, 78, and 80 which underlie respectively frame openings 62, 64, and 66. Mask 74 also has a column of translucent portions 81 defining numbers which represent exposure times in seconds. This column of numbers underlies opening 68 in frame 56. The mask has another translucent portion 82 which underlies opening 60 in the frame to provide a writing space for a purpose to be described.

The windows 84 in each series have substantially identical configuration. Each has the form of a double wedge wherein two apex portions have contiguous points, as illustrated at 86 in FIG. 12. The bases of the wedges are preferably angled inwardly to provide other points 88 defined by acutely angled lines. Points 88 are remote from contiguous points 86. Windows 84 could have shapes other than the double wedge illustrated. The important feature is that the windows be so graduated as to define at least one generally angular point. Best results are obtained when each window is shaped to define a plurality of contiguous points.

The three series 76, 78, 80 have equal numbers of windows 84. Each window of series 80 is aligned with one of the graduated density rectangles in gray scale series 72B, and each window of series 78 and 76 is aligned with one of the density rectangles in series 72G and 72R respectively. The corresponding windows of the three window series are laterally aligned with each other and with an exposure time numeral in column 81. At the bottom of each series of windows is a letter B, G, or R which is visible and which indicates the color of the filter within the opening.

In use, filter wheel 28 is mounted on lens barrel 30 of projector 20 in the manner described. The "Open" opening is rotated into alignment with the lens. A color negative is inserted into the projector in the conventional manner. With the projector light on, the lens is focused to bring the image in the color negative into sharp projected focus on easel 22. Color wheel 40 is rotated clockwise to align the diffusion filter therein with the projector lens. The projector light and other lights in the darkroom are turned off, and a piece of color print paper 24 is placed, emulsion side up, on the easel beneath the projector.

Color calculator 26 is placed on top of the paper with its bottom, i.e., mask 74, engaged against the paper. The projector diaphragm is adjusted to a selected f/stop, for example, f/8; the projector light is turned on, and the paper exposed for a selected period of time, typically about 30 seconds, to expose the paper. The diffusion filter integrates the light emanating from the color negative, and the integrated light passes through filters B, G, and R, the graduated gray scales 72B, 72G, and 72R, and windows 84.

After being exposed, the paper is developed. The developed test print is illustrated in FIG. 13. The print contains three series of images 84' having the shape of windows 84. The images of each series are darkest near the bottom of the test print and gradually become fainter progressing in an upward direction where the graduated gray scale becomes more dense. The test print also contains a reproduction 81' of the column 81 of exposure time numerals in the mask.

To determine the correct exposure time for blue light, the blue column of double wedge images (which has recorded as yellow) is inspected to find the faintest image wherein contiguous points 86' are still sharply defined. In FIG. 13, this image would be that one third from the bottom. This image is represented at the bottom of FIG. 14, and it will be observed that image 86' of the contiguous points in a window 84 and the images 88' of remote points 88 in a window are still intact and well defined. In the image next above, these points have disappeared or become indistinct. The correct exposure time for blue light is determined by reading the numeral in the right-hand column which corresponds to this image; and in the example, this exposure time will be 30 seconds.

Similar readings are made in the green column and the red column (which have recorded respectively as magenta and cyan); and in the example, the correct exposure time for green light will be 15 seconds while the correct exposure time for red light will be 6 seconds.

Filter wheel 28 is turned clockwise to align the blue filter with the projector lens. The room and projector lights are turned off, and a sheet of color print paper is placed, emulsion side up, on easel 22. The paper is exposed for 30 seconds through the blue filter. Next, the filter wheel is turned to align the green filter therein with the projector lens, and the paper is exposed to green light for 15 seconds. Then the filter wheel is again turned to align the red filter therein with the projector lens, and the paper is exposed for 6 seconds to red light. The projector light is, of course, turned off between the successive exposure steps.

The color paper thus exposed is then developed and dried, and the color image thus produced is a highly accurate reproduction of the subject matter recorded in the negative film. The reason for this is that the double wedge images in the test color print give an accurate quantitative indication of the relative amounts of blue, green, and red in the integrated exposing light as recorded by the particular color print paper being used. Thus, calculator 26 facilitates correction for variations in both the color negative film and the color print paper.

In addition, use of the calculator makes it possible for individuals to adjust the color characteristics in a color print according to their personal tastes which may run, for example, to warm tones containing more red or cool tones containing less red and more blue. To accomplish this, the individual may prefer to select an exposure time for a particular color somewhat greater or less than that indicated by the faintest sharply defined double wedge image.

In practice, the presence or absence of a contiguous point image 86' gives the more accurate indication of a correct exposure time while the presence or absence of remote point images 88' provide auxiliary information useful, for example, in double checking that provided by the 86' imagery.

Information such as identification of the negative used in making the test print, type or batch of color print paper, f/stop, exposure time, date, etc., can be written on translucent portion 82 of mask 74 and will be permanently recorded on the test print at 82'.

The step-by-step variation in the densities of scales 72B, 72G, and 72R preferably produces variations in the densities of adjacent images on the test print which correspond to density variations which would result from about one-third of an f/stop variation to provide relatively fine control of the exposure times. Set forth below is a table showing the amount of step-by-step variation in each of the three gray density scales in a calculator found to give excellent results. This table assumes that in calculator 26 Eastman-Wratten color filters or the equivalent are used for the blue, green, and red filter strips as follows: B, blue No. 98; G, green No. 99; R, red No. 70. The density values set forth are the density values appearing in the standard Density Transmittance Table.

| 72R Scale | 72G Scale | 72B Scale | Exposure Time |
|---|---|---|---|
| 1.17 | 0.88 | 0.94 | 1 |
| 1.06 | 0.80 | 0.87 | 1.3 |
| 0.97 | 0.73 | 0.80 | 1.6 |
| 0.91 | 0.67 | 0.73 | 2 |
| 0.84 | 0.61 | 0.67 | 2.5 |
| 0.77 | 0.53 | 0.61 | 3 |
| 0.70 | 0.46 | 0.53 | 4 |
| 0.65 | 0.39 | 0.45 | 5 |
| 0.57 | 0.32 | 0.39 | 6 |
| 0.49 | 0.27 | 0.32 | 7.5 |
| 0.42 | 0.21 | 0.26 | 10 |
| 0.35 | 0.17 | 0.21 | 12 |
| 0.29 | 0.14 | 0.17 | 15 |
| 0.24 | 0.11 | 0.13 | 19 |
| 0.19 | 0.09 | 0.11 | 24 |
| 0.16 | 0.08 | 0.09 | 30 |
| 0.12 | 0.07 | 0.07 | 38 |
| 0.10 | 0.06 | 0.06 | 48 |

By proper selection of filters B, G, and R, the entire scale of the above table of densities can be shifted to range as low as 0.02 or as high as 2.0. By way of example, the color filters in color wheel 28 may be the same as those in the calculator. If desired, the green filter in the color wheel may comprise a green No. 61 Eastman-Wratten filter to extend its filtration range to provide for infrared filtration of the light source of the projector.

In general, other available color filters may be utilized in both the calculator and color wheel; and in such instances, it may be necessary to adjust the densities and density graduations in gray scale element 72 so that each increment of density, when combined with its respective filter, will produce an appropriate response in the color print emulsions.

Color filter strips B, G, and R, gray scale element 72, and mask 74 have been disclosed as separate elements. It is within the scope of the invention, however, to incorporate gray scale density graduations into windows 84 in the mask, thereby eliminating separate gray scale element 72. It is also within the scope of the invention to incorporate the blue, green, and red colors into windows 84, as well as the gray scale variations, with the result that the color filter strips as separate elements are also eliminated. Thus, calculator 26 would have only two members, namely frame 56 with its ribs 58 and the modified mask.

One of the primary functions of calculator frame 56 is to cause the translucent elements in the calculator to lie flat with respect to the test exposure paper. In general, any device which will serve this purpose and which will permit light to pass through the translucent elements of the calculator will be suitable as a frame. By way of example, the various translucent elements or combinations of elements referred to in the previous paragraph could be sandwiched between layers of glass or a clear plastic so long as the resulting sandwich was substantially flat and rigid.

We claim:

1. An exposure calculator for color photographic emulsions which comprises,
   a substantially opaque member having three series of windows therein,
   means providing the windows of said series respectively with red, green, and blue filters of graduated density,
   each of said windows having a portion which tapers acutely and terminates substantially at a point,
   and means providing exposure duration indicia correlated to the densities of said filters.

2. The calculator defined in claim 1 wherein each of said windows has a plurality of said taper portions.

3. The calculator defined in claim 1 wherein each of said windows has two of said taper portions which are opposed with their points contiguous.

4. The calculator defined in claim 1 wherein each of said windows has two sections each of which has a said taper portion, said sections being opposed with their points contiguous, each of said sections having two other portions which taper acutely and terminate substantially at points remote from said contiguous points.

5. The calculator defined in claim 1 wherein said calculator is adapted for use in combination with a projector having a diaphragm adjustable to various f/stops, said graduated densities being correlated to said f/stops.

6. The calculator defined in claim 5 wherein adjacent ones of said densities are so related as to correspond to a variation of about one-third of an f/stop of a said diaphragm.

7. The calculator defined in claim 1 wherein said densities are in the range of from about 0.02 to about 2.00 on the standard Density Transmittance Table.

8. The calculator defined in claim 1 wherein said densities are graduated in a step-by-step manner, the density difference between adjacent steps being in the range of from about 0.01 to about 0.11 on the standard Density Transmittance Table.

9. The calculator defined in claim 1 wherein said means providing each of said filters comprises a colored translucent element secured in laminar relation with a gray translucent element having graduated density.

10. The calculator defined in claim 9 wherein said colored element has substantially uniform density.

11. The calculator defined in claim 9 wherein said opaque member has transparent portions providing said windows, said elements being secured in laminar relation with said transparent portions.

12. The calculator defined in claim 11 wherein each of said elements comprises a strip which spans the length of the series of windows with which it is associated.

13. The calculator defined in claim 12 wherein said series extend substantially parallel to each other and the windows thereof are in laterally aligned groups of three, said gray element having three longitudinally extending portions, each of which has densities which are graduated in a step-by-step manner along its length, said three portions respectively overlying said three series with the steps thereof in registry with the windows of the respective series.

14. The calculator defined in claim 11 wherein said opaque member and said translucent elements comprise exposed and developed photographic films.

15. The calculator defined in claim 13 wherein said indicia comprises a series of numbers on said opaque member extending substantially parallel to said series of windows, said numbers being laterally aligned respectively with said groups of three windows.

16. The calculator defined in claim 14 wherein said films are secured to a supporting frame which defines three slots each exposing one of said three series of windows so that light can pass therethrough.

17. The calculator defined in claim 16 wherein said frame also has an open area, said opaque member having a transparent portion extending across said open area and providing a writing surface.

18. The calculator defined in claim 17 wherein said frame has another open area, said opaque member having a portion which extends across said other open area and which has transparent regions defining numerals, said numerals providing said exposure duration indicia.

19. In combination with the calculator defined in claim 1, a filter device which comprises,
    means forming a holder having a series of openings within which are mounted respectively a diffusion filter, a blue filter, a green filter, and a red filter,
    mounting means adapted to be mounted on the lens barrel of a projector with which said calculator and filter device are adapted to be used,
    said mounting means movably supporting said holder so that said filters can be moved successively into alignment with the lens barrel axis.

20. The combination defined in claim 19 wherein said holder is in the form of a wheel pivotally secured to said mounting means with said series of openings extending circumferentially with respect to the axis of the pivotal mount, said mounting means comprising a ring adapted to be mounted around a lens barrel, said ring being substantially coaxial with a filter rotated into alignment therewith.

21. The combination defined in claim 20 wherein said series includes a fifth opening through which an image can be focused on a photographic plane by the projector.

22. The combination defined in claim 20 wherein said wheel carries phosphorescent indicia for each of said filters, said indicia being disposed substantially diametrically opposite the pivotal mount from the respective filters.

23. The calculator defined in claim 1 wherein said opaque member has transparent portions providing said windows, said windows having graduated gray densities, and a colored translucent element secured in laminar relation over each of said series and cooperating with said gray densities to provide said filters.

24. The calculator defined in claim 23 wherein said member and elements comprise exposed and developed photographic film.

25. The calculator defined in claim 1 wherein said opaque member has translucent portions providing said windows, said windows being colored and having graduated densities to provide said filters.

26. The calculator defined in claim 25 wherein said member and windows therein comprise an exposed and developed photographic film.

* * * * *